July 6, 1937.  F. J. T. BARNES  2,086,207
TAPPING DEVICE
Filed Dec. 19, 1935   2 Sheets-Sheet 1
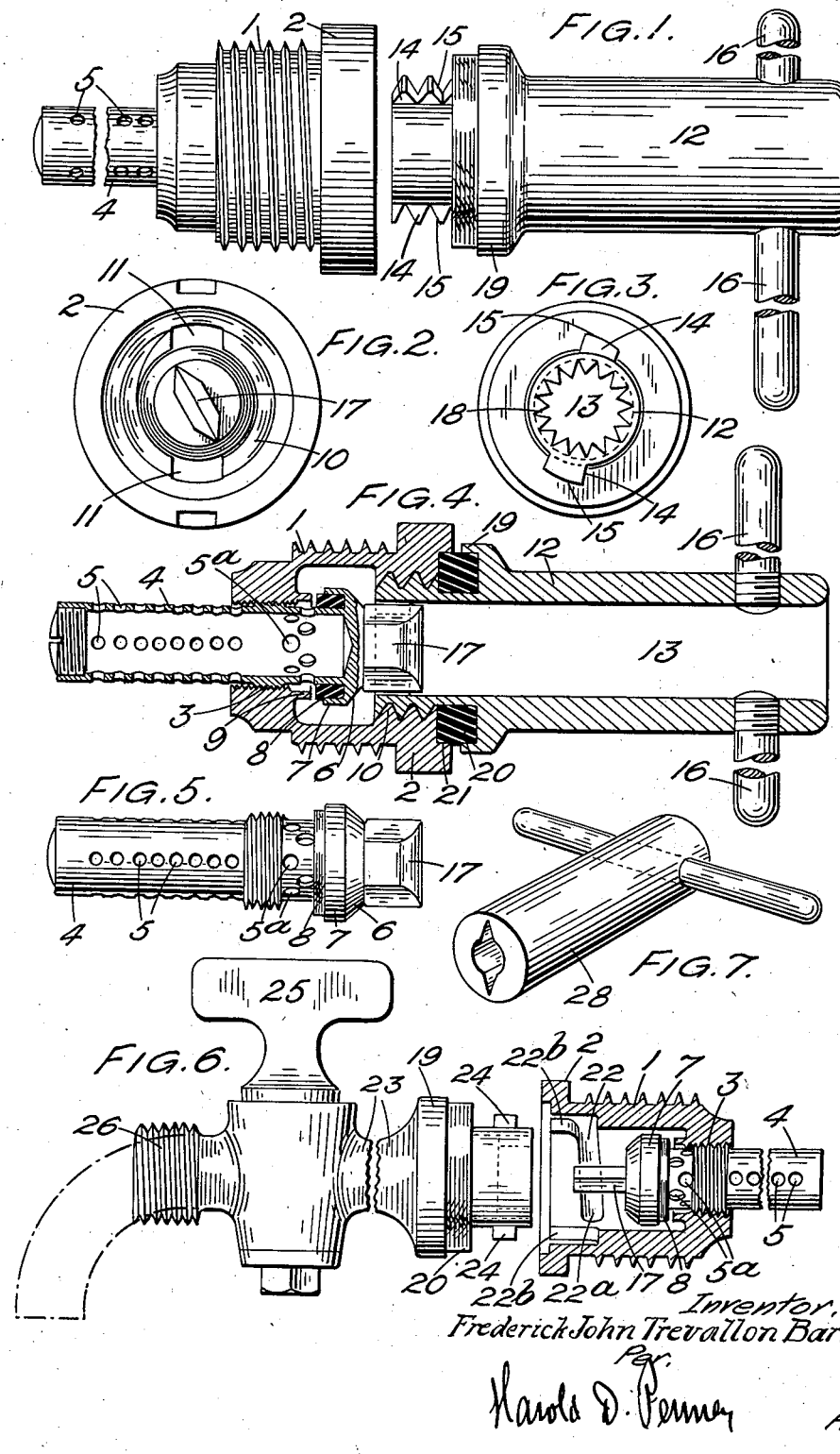
Inventor,
Frederick John Trevallon Barnes.
Per:
Harold D. Penney
Attny.

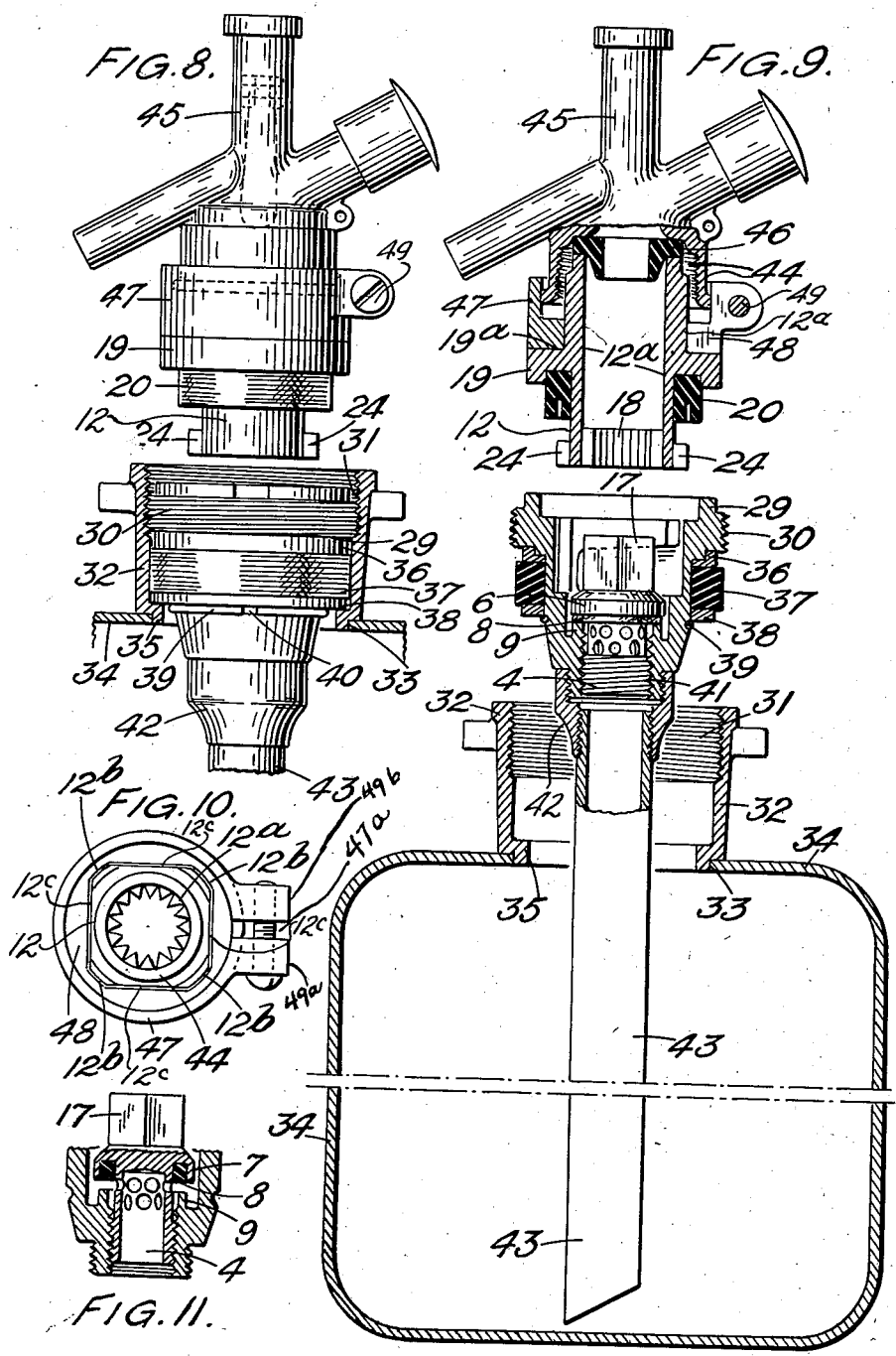

Patented July 6, 1937

2,086,207

UNITED STATES PATENT OFFICE 2,086,207

TAPPING DEVICE

Frederick John Trevallon Barnes, Kingston Hill, England

Application December 19, 1935, Serial No. 55,155
In Great Britain December 31, 1934

9 Claims. (Cl. 225—2)

The present invention relates to an improved device for sealing and opening the tapping hole of a beer cask or other vessel containing fluid, and of the kind comprising a sleeve adapted to be applied to the tapping hole of the vessel and containing a screw operated valve designed normally to seal the opening in the sleeve by which the fluid passes from the vessel, together with a member adapted to form a fluid-tight joint with and screw into the sleeve and to draw off fluid from the vessel, the arrangement being such that when said member is rotated in one direction the valve is unscrewed from its seat, and, when said member is rotated in the other direction, said valve is screwed on to its seat.

The object of the present invention is to provide a device of the kind just referred to in which not only can the draw-off member be easily placed in operative engagement with the valve after the end of said draw-off member has been inserted in the sleeve without it ever being necessary to rotate said member more than a very small amount, but in which such engagement takes place before said member becomes secured against direct axial displacement from the sleeve.

A further object of the invention is to provide improved means for securing the draw-off member within the sleeve, which means acts to secure said member in position, after the member is in operative engagement with the valve and upon said member being further rotated by only a small amount.

A further object is to construct the device so that a still further small amount of rotation of the draw-off member will open the valve.

With these objects in view, the device comprises the combination with the sleeve, of a quick-acting screw-thread within said sleeve; a similarly threaded valve screwed therein to normally close the sleeve to the passage of fluid; a draw-off member having projections arranged circumferentially in spaced relationship to form an interrupted screw-thread; similar projections within said sleeve, spaced circumferentially at a greater distance apart from each other than the circumferential length of the draw-off member projections to form an interrupted thread engageable thereby when said draw-off member is rotated in the same direction as the valve must be rotated to open.

Means are also included whereby the draw-off member and valve may always be placed in operative engagement after the draw-off member projections have entered between the circumferentially spaced ends of the sleeve projections, but sufficiently soon before they have engaged the latter for said valve to be open only during such engagement.

By providing means whereby the effective engagement between the tap and the bush or hole is obtained by giving the tap only a fraction of a turn, not only is it possible to effect the tapping operation at a much greater speed, but in cases where a hose is attached to the tap, the twisting of the hose is reduced to a minimum.

The invention will now be described with reference to the accompanying drawings, in which:—

Fig. 1 is a side view of one form of device according to the present invention, in which the draw-off means is shown as having been removed from the valve carrying portion.

Fig. 2 is an end view of the valve carrying portion, showing the valve therein.

Fig. 3 is an end view of the draw-off means as seen from the inner end thereof.

Fig. 4 is a view, partly in section, of the whole arrangement, showing the draw-off means in its effective position.

Fig. 5 is a side view of the valve, removed from the device.

Fig. 6 is a view, partly in section, of an alternative form of device.

Fig. 7 is a perspective view of a key whereby the valve may be adjusted within, or removed from, the device.

Fig. 8 is a view, partly in section, of a further modification, as applied to a soda water siphon, showing the draw-off means about to be inserted in the valve carrying portion.

Fig. 9 is a similar view, but showing certain of the parts separated to illustrate the manner in which the arrangement is assembled upon the siphon.

Fig. 10 is a plan view of certain parts showing the means whereby the siphon head is secured against rotation upon the draw-off means.

Fig. 11 is a fragmentary sectional view of an alternative form of valve.

Referring to Figs. 1 to 5 of the accompanying drawings, 1 indicates an externally screw-threaded bush adapted to be screwed into the tapping hole of a cask, and provided at its outer end with a flange 2 suitably shaped or recessed to be engaged by a spanner or other suitable tool, to enable the said bush to be screwed into its effective position.

The diameter of the inner portion of the bore of the bush is reduced and provided with a quick acting screw-thread 3 adapted to be engaged by a similarly threaded tubular body 4, the inner and outer portions of which body are plain and the walls of which portions are perforated, as shown at 5 and 5a respectively, the inner end of the bore of said body being closed.

Formed integral with the inner end of the tubular body 4 is a part 6, which forms a closure for the outer end of the bore of said body and extends outwardly beyond the periphery of the body.

The outer portion of the part 6 is provided with a flange 7 concentric with the body 4, and between which flange and body is secured a valve rubber 8, adapted, when the body 4 is rotated in an anticlockwise direction, to seat upon a flange 9 formed upon that portion of the sleeve 1 which is located between the larger and smaller portions of the bore thereof.

From the foregoing it will be readily seen that the tubular body 4 forms a valve stem for the valve 8.

Provided within the outer end portion of the sleeve 1 is an inturned annular flange provided with a screw-thread 10 interrupted or gapped at diametrically opposite points 11, as shown in Fig. 2.

12 indicates generally the draw-off means, which is tubular, the bore 13 of which extends from end to end.

Upon diametrically opposite sides of the inner end of the draw-off tube 12 are cast lugs 14, 14, of less width than the aforesaid gaps 11 and provided with threads 15 designed to engage the thread 10, after the said tube has been inserted in the bush 1 and the lugs 14 have entered the gaps 11.

In order to facilitate manipulation of the draw-off tube, the latter is provided with handles 16, one upon each side thereof.

Formed upon the outer end of the tubular body 4 is a projection 17 chamfered at its outer edge and at each end, as shown more clearly in Fig. 2, and formed at the inner end of the draw-off tube 12 is an inturned annular flange provided all round its inner edge with V-shaped grooves 18, the arrangement being such that diametrically opposite grooves engage the ends of the said projection when the said draw-off tube is inserted in the bush, in order that when said draw-off tube is rotated through a few degrees in a clockwise direction to bring the lugs 14 into engagement with the thread 10, the aforesaid valve is rotated off its seat, as shown in Fig. 4.

When the valve is open, as shown in Fig. 4, liquid can flow from the cask into the perforations 5 of the tube 4, along said tube and out through the perforations 5a into the bush, thence out through the draw-off tube 12.

Carried within and projecting from an undercut enlargement 19 formed upon the tube 12 is a rubber washer 20, adapted to engage with a recess 21 formed in the outer end face of the bush 1, the said washer being of such thickness as to seal the tube 12 to the said bush immediately the lugs 14 engage with the thread 10, and before the valve is opened.

In Fig. 6 is shown a modification, in which, instead of the bush 1 being provided with a screw-thread such as the hereinbefore described thread 10, it is provided on each side of its inner surface with an L-shaped slot such as 22, one portion 22a of which extends circumferentially of the bush but in such a manner as to incline inwardly of the bush from the point where the portion 22b joins it.

The outer end of the portion 22b of each slot 22 terminates in the recess 21, and the draw-off tube, indicated by 23, is provided at diametrically opposite sides of a portion near its inner end with lugs 24, 24, adapted to enter the slots 22 and secure the said tube in position upon being rotated through a few degrees.

The draw-off tube 23 is provided with a cock 25 by which the passage of fluid therealong may be controlled, the outer end of the tube being provided with a screw-thread 26 designed to engage with a hose coupling.

Instead of the outer end of the draw-off tube 23 being provided with a screw-thread, as just described, it may be plain, and extended as indicated by the interrupted lines 27, should it be desired to pour direct from the end of the said tube, instead of passing the fluid through a further pipe or hose.

In Fig. 7 is shown a key 28 for initially screwing the valves upon the seats or screwing them further into the bushes to take up any wear which may have taken place.

In Figs. 8 and 9 is shown a device for use in sealing and drawing off liquid from containers in which the said liquid is stored under gas pressure, for example a soda water siphon.

In this arrangement the bush 1, the internal construction of which is substantially similar to that of the bush shown in Fig. 6, is provided at its upper end with a portion 29 of enlarged external diameter.

The enlarged portion 29 is provided with a screw-thread 30 adapted to engage with a screw-thread 31 formed in the upper end of a sleeve 32 brazed or otherwise secured at its lower end in a perforation 33 provided at the upper end of a metal container 34.

The lower end of the sleeve 32 is provided with an inturned annular flange 35, and sandwiched between a pair of washers 36, 38, located upon the bush 1 at a point below the enlarged portion 29 is a rubber washer 37, the arrangement being such that when the said bush is screwed into the sleeve 32 the washer 38 engages with the flange 35 and the rubber washer 38 is compressed so that it expands laterally against the lower portion of the inner surface of said sleeve and thus forms a fluid tight joint between the latter and said bush.

In order to prevent the washers 36, 37 and 38 from falling off or otherwise becoming removed from the bush 1, a wire annulus 39 is sprung into a recess 40 upon said bush at a level below the washer 38.

The lower end of the bush 1 is reduced at 41 and screwed to receive an adapter 42, the lower portion of which is internally screwed to receive the upper end of the siphon tube 43.

The tubular body 4 or valve stem in this arrangement is of such length as not to extend below the lower end of the aforesaid portion 41 when the valve 8 is closed, said body 4, moreover, being open at its lower end.

The draw-off member 12 is provided with the enlargement or annular flange 19 and the portion of this draw-off member located above the flange 19, and indicated by 12a, is provided with an external screw-thread 12b and is on the outside provided with four flat portions 12c arranged upon opposite sides of said portion 12a, as seen more clearly when viewing the upper end of the draw-off member as in Fig. 10, in which latter it will be seen that the flat portions not only form circumferential interruptions in the thread 12b, but are of such width as to make the outline of the said portion 12a, square, except for the rounded and thread-bearing corners. The screw-thread 12b is adapted to have screwed thereon the internally threaded skirt portion 44 of a head 45 such as is used upon soda water syphons. Before the head 45 is screwed, as just described, upon the screw-threaded upper end portion of the draw-off member 12, a collar 47, split at 47a, is placed over this portion, the bore of the upper portion of which collar is of such length and diameter that the aforesaid skirt portion 44 of the head 46 enters said bore as the head is screwed onto the draw-off member.

The bore at the lower end of the split collar 47 is reduced at 48 and squared to loosely fit the square outline of the portion of the draw-off member immediately above the flange 19 (as shown more clearly in Fig. 10), but at the same time being of a sufficiently good fit to prevent rotation of the collar 47 thereon.

After the syphon head has been screwed onto the draw-off member 12, as aforesaid, the collar 47 is clamped onto or tightly drawn around the skirt portion of said head by means of a clamping screw 49, which passes through a clearance hole in a lug 49a and screws into a lug 49b, these two lugs being formed integral with the said collar, as shown in Fig. 10.

It will be readily seen from the foregoing that when the collar 47 is clamped, as just described, upon the skirt portion of the head 45, it will prevent the latter from being accidentally unscrewed from the draw-off member 12.

In order to form a fluid-tight joint between the syphon head 45 and the draw-off member 12, a rubber washer 46 is inserted between the upper end of said draw-off member and the said head.

The aforesaid enlargement or annular flange 19 is undercut and provided with a rubber washer 20, similar to that provided in the arrangement shown in Figs. 1, 4 and 6, and for the purpose of ensuring a fluid-tight joint between the draw-off member and the sleeve 1.

The draw-off member 12 in this arrangement is provided with lugs 24 which are adapted to engage in slots 22 similar to those described with reference to Fig. 6, and for the purpose of likewise holding the draw-off member 12 within the sleeve 1.

In Fig. 11 is shown a preferred construction of valve having a raised seat 9 of the kind hereinbefore described, but in which the length of the flange 7 is such as to completely house the valve rubber 8, the internal diameter of the said flange being, of course, greater than the external diameter of said seat portion.

In all forms of the invention the gaps 11 and the lugs 14 or the slots 22b and lugs 24, as the case may be, are of such width relative to each other as to enable the grooves 18 to be brought into engagement with the projections 17 before the draw-off devices are actually secured within the bushes, irrespective of the angular position of the said projections.

In all the arrangements described and illustrated in the drawings, the screw-thread 3 upon the valve stem 4 and the thread with which it engages in the inner end of the sleeve 1 are of opposite hand to the thread upon the draw-off member and the thread with which it engages in the outer end of the said sleeve.

I claim:

1. A device for sealing and opening and tapping hole of a beer cask or other vessel for containing fluid, comprising a sleeve adapted to be applied to the tapping hole of the vessel; a quick-acting screw-thread within said sleeve; a similarly threaded valve screwed therein to normally close said sleeve to the passage of fluid; a grooved portion within said sleeve; a draw-off member adapted to be applied to said sleeve; projections upon said draw-off member, adapted to enter said grooved portion and to subsequently engage therein when said draw-off member is rotated in the same direction as the valve must be rotated to open; and means whereby said draw-off member and valve may always be placed in operative connection after said projections have entered said grooved portion, but sufficiently soon before they have engaged the latter for said valve to be open only during such engagement.

2. A device for sealing and opening the tapping hole of a vessel for containing liquid under gas pressure, comprising a sleeve adapted to be applied to the tapping hole of the vessel; a quick-acting screw-thread within said sleeve; a similarly threaded valve screwed therein to normally close said sleeve to the passage of fluid; a grooved portion within said sleeve; a draw-off member including a tube adapted to be applied to said sleeve; means upon the outer end of said tube designed to receive a soda-water siphon head; projections upon said draw-off member, adapted to enter said grooved portion and to subsequently engage therein when said draw-off member is rotated in the same direction as the valve must be rotated to open; and means whereby said draw-off member and valve may always be placed in operative connection after said projections have entered said grooved portion, but sufficiently soon before they have engaged the latter for said valve to be open only during such engagement; together with an adapter at the inner end of said sleeve and a syphon tube connected by said adapter to said sleeve for conducting the liquid under pressure to the latter.

3. A device for sealing and opening the tapping hole of a vessel for containing liquid under gas pressure, comprising a sleeve adapted to be applied to the tapping hole of the vessel; a quick-acting screw-thread within said sleeve; a similarly threaded valve screwed therein to normally close said sleeve to the passage of fluid; a grooved portion within said sleeve; a draw-off member including a tube adapted to be applied to said sleeve; a screw-thread upon the outer end of said tube designed to receive a soda-water syphon head; projections upon said tube, adapted to enter said grooved portion and to subsequently engage therein when said draw-off member is rotated in the same direction as the valve must be rotated to open; and means whereby said draw-off member and valve may always be placed in operative connection after said projections have entered said grooved portion, but sufficiently soon before they have engaged the latter for said valve to be open only during such engagement; together with an adapter at the inner end of said sleeve; and a syphon tube connected by said adapter to said sleeve for conducting the liquid under pressure to the latter.

4. A device for sealing and opening the tapping hole of a vessel for containing liquid under gas pressure, comprising a sleeve adapted to be applied to the tapping hole of the vessel; a quick-acting screw-thread within said sleeve; a similarly threaded valve screwed therein to normally close said sleeve to the passage of fluid; a grooved portion within said sleeve; a draw-off member including a tube adapted to be applied to said sleeve; projections upon said tube, adapted to enter said grooved portion and to subsequently engage therein when said draw-off member is rotated in the same direction as the valve must be rotated to open; and means whereby said draw-off member and valve may always be placed in operative engagement after said projections have entered said grooved portion, but sufficiently soon before they have engaged the latter for said valve to be open only during such engagement; a screw-thread upon the outer end of said tube, for receiving a soda water syphon head; a split collar non-rotatively mounted upon said tube, a screw within said collar adapted to draw the latter tightly around the lower end of said head and clamp the latter against accidental displacement; an adapter at the inner end of said sleeve; a syphon tube connected by said adapter to said sleeve for conducting the liquid under pressure to the latter.

5. A device for sealing and opening the tapping hole of a beer cask or other vessel for containing fluid, comprising a sleeve adapted to be applied to the tapping hole of the vessel; a reduced inner end portion within the bore of said sleeve; a valve; a hollow perforated valve stem upon which said valve is carried; a quick-acting screw-thread upon said stem; a similar thread within said reduced portion with which the thread on said stem engages; a seat within said sleeve formed between said inner reduced portion and the larger portion of said bore, with which seat said valve normally is in engagement to seal said sleeve; a grooved portion within the outer part of said sleeve; a fluid draw-off member adapted to be applied to said sleeve; projections upon said draw-off member adapted to enter said grooved portion and to subsequently engage therein when said draw-off member is rotated in the same direction as the valve must be rotated to open; an outwardly directed extension upon and disposed diametrically across said valve; and an inturned annular flange upon the inner end of said draw-off member; a series of teeth on said flange adapted to engage opposite ends of said extension when said projections are inserted in the grooved portion of the sleeve, so that said valve is unscrewed from its seat as said projections engage said grooved portion during rotation in one direction of said draw-off member, and is screwed back onto its seat as said member is afterward rotated in the reverse direction to disengage said projections from said grooved portion.

6. A device for sealing and opening the tapping hole of a beer cask or other vessel for containing fluid, comprising a sleeve adapted to be applied to the tapping hole of the vessel; a reduced inner end portion within the bore of said sleeve; a valve; a hollow valve stem perforated to form a filter and upon which said valve is carried; a quick-acting screw-thread upon said stem; a similar thread within said reduced portion with which the thread on said stem engages; a seat within said sleeve formed between said inner reduced portion and the larger portion of said bore, with which seat said valve normally is in engagement to seal said sleeve; a grooved portion within the outer part of said sleeve; a fluid draw-off member adapted to be applied to said sleeve; projections upon said draw-off member adapted to enter said grooved portion and to subsequently engage therein when said draw-off member is rotated in the same direction as the valve must be rotated to open; an outwardly directed extension upon and disposed diametrically across said valve; and an inturned annular flange upon the inner end of said draw-off means; a series of teeth on said flange adapted to engage opposite ends of said extension when said projections are inserted in the grooved portion of the sleeve, so that said valve is unscrewed from its seat as said projections engage said grooved portion during rotation in one direction of said draw-off member and is screwed back onto its seat as said member is afterward rotated in the reverse direction to disengage said projections from said grooved portion.

7. A device for sealing and opening the tapping hole of a beer cask or other vessel for containing fluid, comprising a sleeve adapted to be applied to the tapping hole of the vessel; a reduced inner end portion within the bore of said sleeve; a valve; a hollow perforated valve stem upon which said valve is carried; a quick-acting screw-thread upon said stem; a similar thread within said reduced portion with which the thread on said stem engages; a seat within said sleeve formed between said inner reduced portion and the larger portion of said bore, with which seat said valve normally is in engagement to seal said sleeve; a grooved portion within the outer part of said sleeve; a fluid draw-off member adapted to be applied to said sleeve; projections upon said draw-off member adapted to enter said grooved portion and to subsequently engage therein when said draw-off member is rotated in the same direction as the valve must be rotated to open; an outwardly directed extension upon and disposed diametrically across said valve and chamfered at each end and along the outer edge; and an inturned annular flange upon the inner end of said draw-off means; a series of triangular shaped teeth on said flange adapted to engage opposite ends of said extension when said projections are inserted in the grooved portion of the sleeve, so that said valve is unscrewed from its seat as said projections engage said grooved portion during rotation in one direction of said draw-off member and is screwed back onto its seat as said member is afterwards rotated in the reverse direction to disengage said projections from said grooved portion.

8. A device for sealing and opening the tapping hole of a beer cask or other vessel for containing fluid, comprising a sleeve adapted to be applied to the tapping hole of the vessel; a screw-operated valve; a seat for said valve with which the latter is adapted normally to cooperate to seal said sleeve; a grooved portion within the outer part of said sleeve; a fluid draw-off member adapted to be applied to said sleeve; projections upon said draw-off member adapted to enter said grooved portion and to subsequently engage therein when said draw-off member is rotated in the same direction as the valve must be rotated to open; an undercut flange upon said draw-off member; an under-cut flange upon the outer end of said sleeve; and a washer adapted to be compressed within said undercut flanges to ensure a fluid-tight joint between said member and the sleeve; the arrangement being such that as said projections engage said grooved portion during rotation in one direction of said draw-off member, said valve will be unscrewed from its seat, and screwed back onto its seat as said member is afterward rotated in the reverse direction to disengage said projections from said grooved portion.

9. A device for sealing and opening the tapping hole of a beer cask or other vessel for containing fluid, comprising a sleeve adapted to be applied to the tapping hole of the vessel; a reduced inner end portion within the bore of said sleeve; a hollow perforated valve stem closed at its outer end; an outwardly extending undercut annular flange around the outer end of said stem; a valve washer within said undercut flange; a quick-acting screw-thread upon said stem; a similar thread within said reduced portion with which the thread on said stem engages; a seat within said sleeve formed between said inner reduced portion and the larger portion of said bore, with which seat said valve washer is normally in engagement to close said sleeve; a grooved portion within said sleeve; a fluid draw-off member adapted to be applied to said sleeve; projections upon said draw-off member adapted to enter said grooved portion and to subsequently engage therein when said draw-off member is rotated in the same direction as the valve must be rotated to open; and means whereby said draw-off member and valve may always be placed in operative connection after said projections have entered said grooved portion, but sufficiently soon before they have engaged the latter for said valve to be open only during such engagement.

FREDERICK JOHN TREVALLON BARNES.